US008224966B2

(12) United States Patent
Tate et al.

(10) Patent No.: US 8,224,966 B2
(45) Date of Patent: Jul. 17, 2012

(54) REPROXYING AN UNPROXIED CONNECTION

(75) Inventors: Patrick Darrell Tate, Dunwoody, GA (US); Alexander S. Waterman, Los Gatos, CA (US); Martin David Grimm, Snoqualmie, WA (US); Anurag Kahol, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1052 days.

(21) Appl. No.: 10/925,396

(22) Filed: Aug. 24, 2004

(65) Prior Publication Data

US 2006/0047839 A1    Mar. 2, 2006

(51) Int. Cl.
| | |
|---|---|
| G06F 15/16 | (2006.01) |
| G06F 15/173 | (2006.01) |
| G06F 11/00 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ........ 709/227; 709/207; 709/217; 709/218; 709/219; 709/228; 709/229; 709/239; 370/235; 370/236

(58) Field of Classification Search .................. 709/230, 709/227

See application file for complete search history.

(56) References Cited

U.S. PATENT DOCUMENTS

| | | | |
|---|---|---|---|
| 5,937,169 A | 8/1999 | Connery et al. | |
| 5,941,988 A | 8/1999 | Bhagwat et al. | |
| 5,961,605 A | 10/1999 | Deng et al. | |
| 5,978,849 A * | 11/1999 | Khanna | 709/227 |
| 6,006,268 A * | 12/1999 | Coile et al. | 709/227 |
| 6,098,093 A | 8/2000 | Bayeh et al. | |
| 6,173,322 B1 * | 1/2001 | Hu | 709/224 |
| 6,298,380 B1 * | 10/2001 | Coile et al. | 709/227 |
| 6,338,089 B1 | 1/2002 | Quinlan | |
| 6,389,462 B1 * | 5/2002 | Cohen et al. | 709/218 |
| 6,411,986 B1 | 6/2002 | Susai et al. | |
| 6,598,081 B1 * | 7/2003 | Coile et al. | 709/227 |
| 6,615,265 B1 | 9/2003 | Leymann et al. | |
| 6,725,281 B1 * | 4/2004 | Zintel et al. | 719/318 |

(Continued)

OTHER PUBLICATIONS

U.S. Appl. No. 10/892,906, filed Jul. 16, 2004, Office Action, Jun. 25, 2008.

(Continued)

*Primary Examiner* — Krista Zele
*Assistant Examiner* — Tariq Najee-Ullah
(74) *Attorney, Agent, or Firm* — Hickman Palermo Truong Becker Bingham Wong LLP

(57) ABSTRACT

A method is disclosed for reproxying connections. According to one aspect, a first connection is established between a client and a proxy device. A second connection is established between the proxy device and a server. The first connection comprises a first endpoint at the client and a second endpoint at the proxy device. The second connection comprises a third endpoint at the proxy device and a fourth endpoint at the server. The first and second connections are unproxied by dissolving the second and third endpoints while maintaining the first and fourth endpoints. After the connections have been unproxied, a packet is received at the proxy device. In response, the first and second connections are reproxied by creating fifth and sixth endpoints at the proxy device, so that the first connection comprises the fifth endpoint and the second connection comprises the sixth endpoint.

35 Claims, 9 Drawing Sheets

U.S. PATENT DOCUMENTS

| | | | |
|---|---|---|---|
| 6,775,692 B1 * | 8/2004 | Albert et al. | 709/207 |
| 6,779,004 B1 * | 8/2004 | Zintel | 709/227 |
| 6,801,927 B1 | 10/2004 | Smith et al. | |
| 6,857,009 B1 * | 2/2005 | Ferreria et al. | 709/219 |
| 6,892,230 B1 * | 5/2005 | Gu et al. | 709/220 |
| 6,968,389 B1 * | 11/2005 | Menditto et al. | 709/233 |
| 6,975,647 B2 * | 12/2005 | Neale et al. | 370/466 |
| 7,085,814 B1 * | 8/2006 | Gandhi et al. | 709/208 |
| 7,337,226 B2 | 2/2008 | Saha et al. | |
| 7,406,709 B2 | 7/2008 | Maher et al. | |
| 2002/0085549 A1 * | 7/2002 | Reza et al. | 370/389 |
| 2002/0091738 A1 * | 7/2002 | Rohrabaugh et al. | 707/517 |
| 2002/0112152 A1 * | 8/2002 | VanHeyningen et al. | 713/151 |
| 2002/0143954 A1 | 10/2002 | Aiken et al. | |
| 2002/0188743 A1 * | 12/2002 | Schaffrath | 709/230 |
| 2002/0199114 A1 | 12/2002 | Schwartz | |
| 2003/0028666 A1 | 2/2003 | Hanner | |
| 2003/0041095 A1 | 2/2003 | Konda et al. | |
| 2003/0120811 A1 | 6/2003 | Hanson et al. | |
| 2003/0123481 A1 * | 7/2003 | Neale et al. | 370/466 |
| 2003/0172169 A1 | 9/2003 | Cheng | |
| 2004/0006625 A1 | 1/2004 | Saha et al. | |
| 2004/0088413 A1 | 5/2004 | Bhogi et al. | |
| 2004/0205644 A1 | 10/2004 | Shaughnessy et al. | |
| 2005/0015356 A1 | 1/2005 | Ireland et al. | |
| 2005/0060372 A1 | 3/2005 | DeBettencourt et al. | |
| 2005/0076126 A1 * | 4/2005 | Knight et al. | 709/227 |
| 2005/0120117 A1 | 6/2005 | Burckart et al. | |
| 2005/0149940 A1 | 7/2005 | Calinescu et al. | |
| 2005/0172029 A1 | 8/2005 | Burke et al. | |
| 2005/0198261 A1 | 9/2005 | Durvasula et al. | |
| 2006/0031520 A1 * | 2/2006 | Bedekar et al. | 709/227 |
| 2006/0031571 A1 * | 2/2006 | Banerjee et al. | 709/238 |
| 2006/0168224 A1 | 7/2006 | Midgley | |
| 2006/0190612 A1 | 8/2006 | Kahol | |
| 2006/0282662 A1 * | 12/2006 | Whitcomb | 713/156 |

OTHER PUBLICATIONS

U.S. Appl. No. 10/892,906, filed Jul. 16, 2004, Advisory Action, Aug. 13, 2008.

U.S. Appl. No. 11/061,248, filed Feb. 18, 2005, Final Office Action, Jan. 22, 2010.

U.S. Appl. No. 10/892,906, Jul. 16, 2004, Office Action, Mar. 16, 2010.

* cited by examiner

REPROXYING AN UNPROXIED CONNECTION

FIELD OF THE INVENTION

The present invention generally relates to proxy devices in computer networks. The invention relates more specifically to a method and apparatus for reproxying an unproxied connection.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is commonplace nowadays for a web browser ("client") to access content that is stored on remote server by sending a request to the remote server's Universal Resource Locator (URL) and receiving the content in response. Web sites associated with very popular URLs receive an extremely large volume of such requests from separate clients. In order to handle such a large volume of requests, these web sites sometimes make use of a proxy device that initially receives requests and distributes them, according to some scheme, among multiple servers.

One such scheme attempts to distribute requests relatively evenly among servers that are connected to the proxy device. A proxy device employing this scheme is commonly called a "load balancer." When successful, a load balancer helps to ensure that no single server in a server "farm" becomes inundated with requests.

When a proxy device receives a request from a client, the proxy device determines to which server, of many servers, the request should be directed. For example, a request might be associated with a session that is associated with a particular server. In that case, the proxy device might need to send the request to the particular server with which the session is associated.

A proxy device typically communicates with servers using a suite of protocols. For example, the proxy device may use the Internet Protocol (IP), Transport Control Protocol (TCP), and Hypertext Transfer Protocol (HTTP) in combination to communicate with a server. Some of these protocols are connection-oriented. Connection-oriented protocols typically require negotiating connection-related parameters between parties to the connection before the connection is "opened." Data can be sent through the connection only after these parameters have been negotiated and the connection has been opened.

Parameter negotiation is often achieved through a "handshake" phase of a protocol. A handshake phase usually requires a significant amount of communication between the parties. When encryption is involved, a handshake phase also may require a significant amount of processing by the parties. Due to this communication and processing overhead, the transmission of substantive content between the parties may be delayed significantly.

After a connection has been opened between the proxy device and a particular server, the proxy device receives a request from a client and forwards that request to the particular server through the connection. The particular server sends a response to the proxy device through the connection. The proxy device forwards the response to the client. Several requests and responses might be sent through the connection during the course of a transaction between the client and the particular server. The combination of the client-to-proxy device connection and the corresponding proxy device-to-server connection is called a "proxied" connection.

The client-to-proxy device connection and the proxy device-to-server connection each may be a full TCP connection. A full TCP connection involves one TCP endpoint at the proxy device at one end of the full TCP connection, and another endpoint at the other end of the full TCP connection (at the client or server). Maintaining a full TCP connection involves significant resource overhead. In order for a proxy device to maintain full TCP connections, the proxy device needs to store and maintain, for each TCP endpoint at the proxy device, the parameters negotiated during the handshake phase for the corresponding full TCP connection. For each TCP endpoint at the proxy device, the proxy device stores these parameters in a separate TCP control block (TCB). Due to the storage required for TCBs and other overhead involved in maintaining a full TCP connection, a proxy device can allow only a limited number of full TCP connections at a time.

In order to permit a larger number of clients and servers to communicate through a proxy device concurrently, the proxy device can "unproxy" proxied connections. Unproxying is described in U.S. Pat. Nos. 6,006,268, 6,298,380, and 6,598,081. As discussed above, a proxied connection may involve two separate full TCP connections: a client-to-proxy device connection and a proxy device-to-server connection. Also as discussed above, each of these full TCP connections comprises two separate endpoints, one of which is maintained at the proxy device. To unproxy a proxied connection, the proxy device creates a connection block data structure (not a TCB) for each of the proxied connection's two TCP endpoints maintained at the proxy device. In each such connection block data structure, the proxy device stores (a) information that identifies the entity on the other end of the TCP connection (the client or server) and (b) a subset of the information contained in the corresponding TCP endpoint's TCB. With this information stored in the connection block data structures, the proxy device can dissolve the TCP endpoints maintained at the proxy device, leaving the TCP endpoints maintained at the client and server intact. The proxy device may free resources that were used to maintain the dissolved TCP endpoints' TCBs. Consequently, the proxy device may use those resources to establish other full TCP connections with other clients and servers.

The dissolution of the TCP endpoints at the proxy device does not sever the formerly proxied connection between the client/server pair that used the formerly proxied connection to communicate via the proxy device. Instead, after the dissolution, the formerly proxied connection persists as an "unproxied" connection. The server may send a packet to the client through the unproxied connection by sending the packet through the TCP endpoint remaining at the server. The packet contains addressing information that identifies the server and the client. The proxy device receives the packet and determines which connection block data structure contains information that matches the addressing information contained in the packet. After determining such a "matching" connection block data structure, the proxy device uses the information stored in the matching connection block data structure to (a) "translate" the packet's TCP sequence and acknowledgement numbers and (b) send the packet to the client. The client receives the packet at the client's remaining TCP endpoint. Although the TCP endpoints at the proxy device no longer exist, the unproxied connection appears, to the client and the server, to be the same as the proxied connection that the unproxied connection replaced.

Because a connection block data structure consumes considerably fewer resources than a TCB, the number of unproxied connections that a proxy device can maintain concurrently is significantly larger than the number of proxied connections that the proxy device can maintain concurrently. Additionally, because a proxy device is not responsible for guaranteeing reliable transport on an unproxied connection (the guarantee becomes the responsibility of the client and server), the proxy device is spared the burden of performing the operations needed to guarantee reliable transport on unproxied connections. Packets sent from servers to clients are not subject to load-balancing decisions, and can be transmitted using the relatively abundant unproxied connections. This allows the relatively scarce proxied connections to be reserved for transmitting packets from clients to servers, as such packets may be subject to a load-balancing decision by the proxy device.

Despite the benefits offered by unproxied connections, circumstances may arise in which an unproxied connection does not allow some desirable operations to be performed. In order to allow these operations to be performed, TCP endpoints might be needed at the proxy device after a formerly proxied connection has been unproxied. One approach to re-establishing TCP endpoints at the proxy device might involve the total dissolution of the existing unproxied connection and the formation of completely new, full TCP connections between the client/proxy device and proxy device/server pairs. However, such an approach would require additional handshake phases, which, as described above, are time-consuming. Furthermore, any new connections established in this manner would not appear to the client and the server to be the same as the former connections. The TCP endpoints at the client and the server would not be the same as the former TCP endpoints at the client and the server. As a result, the client and the server would carry the burden of adapting to use the new connections instead of the dissolved connections; transparency would be destroyed.

Thus, such an approach would be awkward and inefficient. A more elegant and efficient technique for re-establishing TCP endpoints at a proxy device after a connection has been unproxied is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
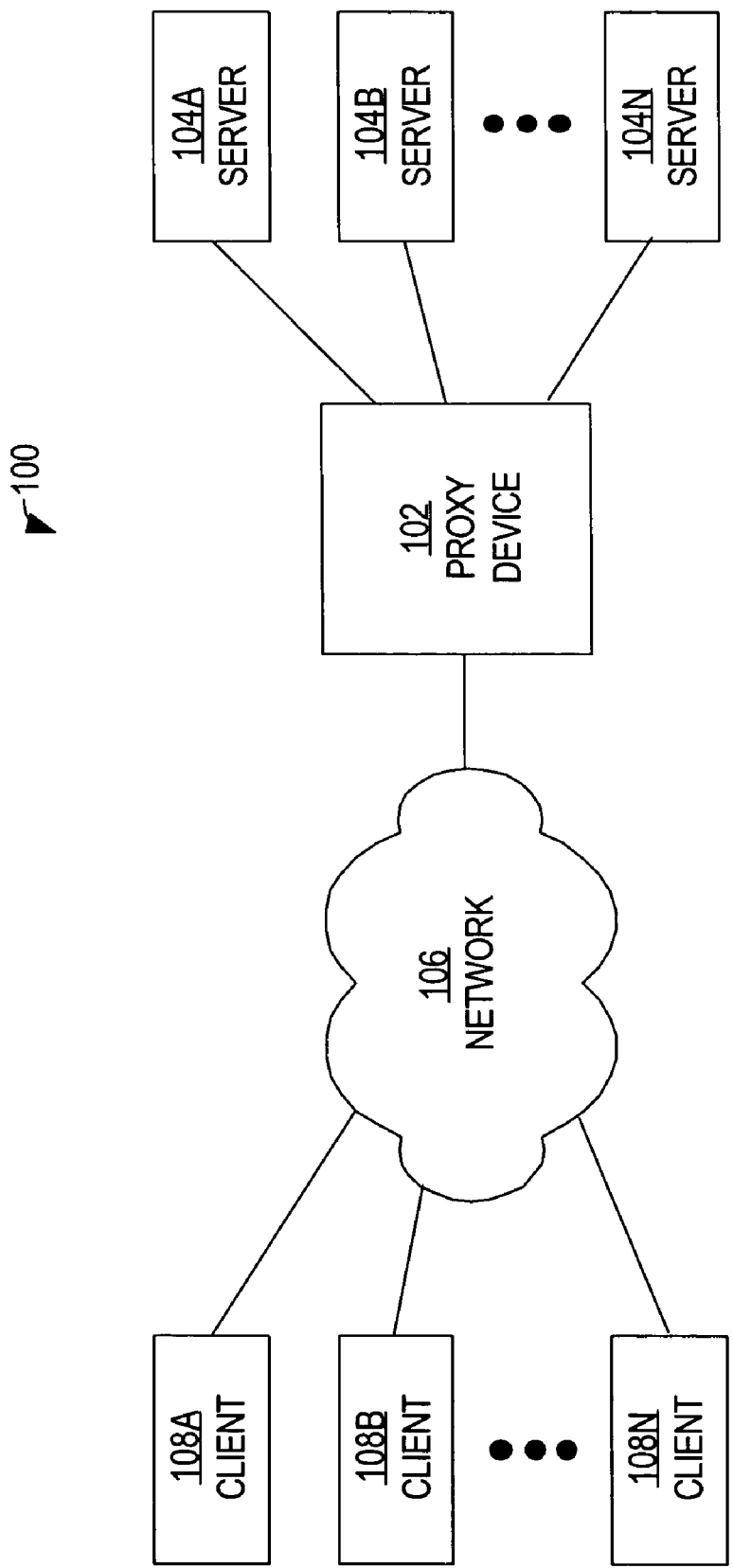
FIG. 1 is a block diagram that illustrates an overview of one embodiment of a system in which a proxy device reproxies an unproxied, formerly proxied connection.

A method and apparatus for reproxying an unproxied, formerly proxied connection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| 1.0 | General Overview |
| 2.0 | Structural and Functional Overview |
| 3.0 | Implementation Examples |
| 4.0 | Implementation Mechanisms-Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for reproxying an unproxied, formerly proxied connection. According to one embodiment, a first connection is established between a client and a proxy device. A second connection is established between the proxy device and a server. The first connection comprises an endpoint at the client and an endpoint at the proxy device. The second connection comprises another endpoint at the proxy device and an endpoint at the server. The first and second connections are unproxied by dissolving the endpoints at the proxy device while maintaining the endpoints at the client and server. Some of the information needed to reconstruct the proxy device's endpoints is stored at the proxy device. After the connections have been unproxied, a packet sent through either the client's endpoint or the server's endpoint is received at the proxy device. In response, the first and second connections are reproxied by reconstructing the two endpoints at the proxy device using both the previously stored information and information contained in the packet, so that the first connection comprises one of the reconstructed endpoints and the second connection comprises the other reconstructed endpoint.

Because the endpoints at the client and server are retained throughout the unproxying and reproxying processes, and because the proxy device's endpoints are reconstructed using previously stored information and information contained in the packet, no additional handshake phases need to be performed, and the reproxied connection appears, to the client and server, to be the same as the original proxied connection. Because the reproxied connection comprises endpoints at the proxy device, the proxy device can inspect and modify the content of packets received from a server—even changing the length of those packets by doing so—prior to sending the packets to the client for which the packets are destined.

In other aspects, the invention encompasses a computer apparatus and a computer-readable medium configured to carry out the foregoing steps.

2.0 Structure and Functional Overview

FIG. 1 is a block diagram that illustrates an overview of one embodiment of a system 100 in which a proxy device 102 reproxies an unproxied, formerly proxied connection. Proxy device 102 may be, for example, a load balancer.

Proxy device 102 is coupled communicatively with servers 104A-N. Each of servers 104A-N may be a separate computer. Alternatively, each of servers 104A-N may be a separate process executing on the same or on separate computers. Servers 104A-N receive requests from proxy device 102 and send responses to proxy device 102. Such requests and responses may be, for example, HTTP requests and responses carried over TCP.

Proxy device 102 also is coupled communicatively with a network 106. Network 106 is a computer network, such as, for example, a local area network (LAN), wide area network (WAN), or internetwork such as the Internet. Clients 108A-N also are coupled communicatively with network 106. Each of clients 108A-N may be a separate computer. Alternatively, each of clients 108A-N may be a separate process executing on the same or on separate computers. For example, each of clients 108A-N may be a separate web browser process.

Clients 108A-N send requests through network 106 to proxy device 102. Proxy device 102 sends such requests to various ones of servers 104A-N. Proxy device 102 receives responses to such requests from those of servers 104A-N that receives the requests. Proxy device 102 sends those responses through network 106 to those of clients 108A-N that sent the corresponding requests.

Before sending a request to a server, proxy device 102 may inspect the contents of the request, including contents of packet payloads in which the request is contained. Proxy device 102 may modify these contents before sending the request to a server.

Proxy device 102 determines which of servers 108A-N should receive the request. For example, proxy device 102 may examine the request to determine a session that is associated with the request, and then determine which of servers 108A-N is associated with that session. For another example, proxy device may select one of servers 108A-N to receive the request based on a load-balancing scheme that is designed to distribute requests among servers 108A-N relatively evenly.

After determining which particular server of servers 108A-N should receive the request, proxy device 102 sends the request to the particular server. However, before proxy device 102 receives a request from a particular client, a TCP connection between proxy device 102 and the particular client is established to carry packets that contain the request. Additionally, before proxy device 102 sends a request to a particular server, a TCP connection between proxy device 102 and the particular server is established to carry packets that contain the request. A technique by which these TCP connections are established is described below with reference to FIG. 2.

Figure 2:
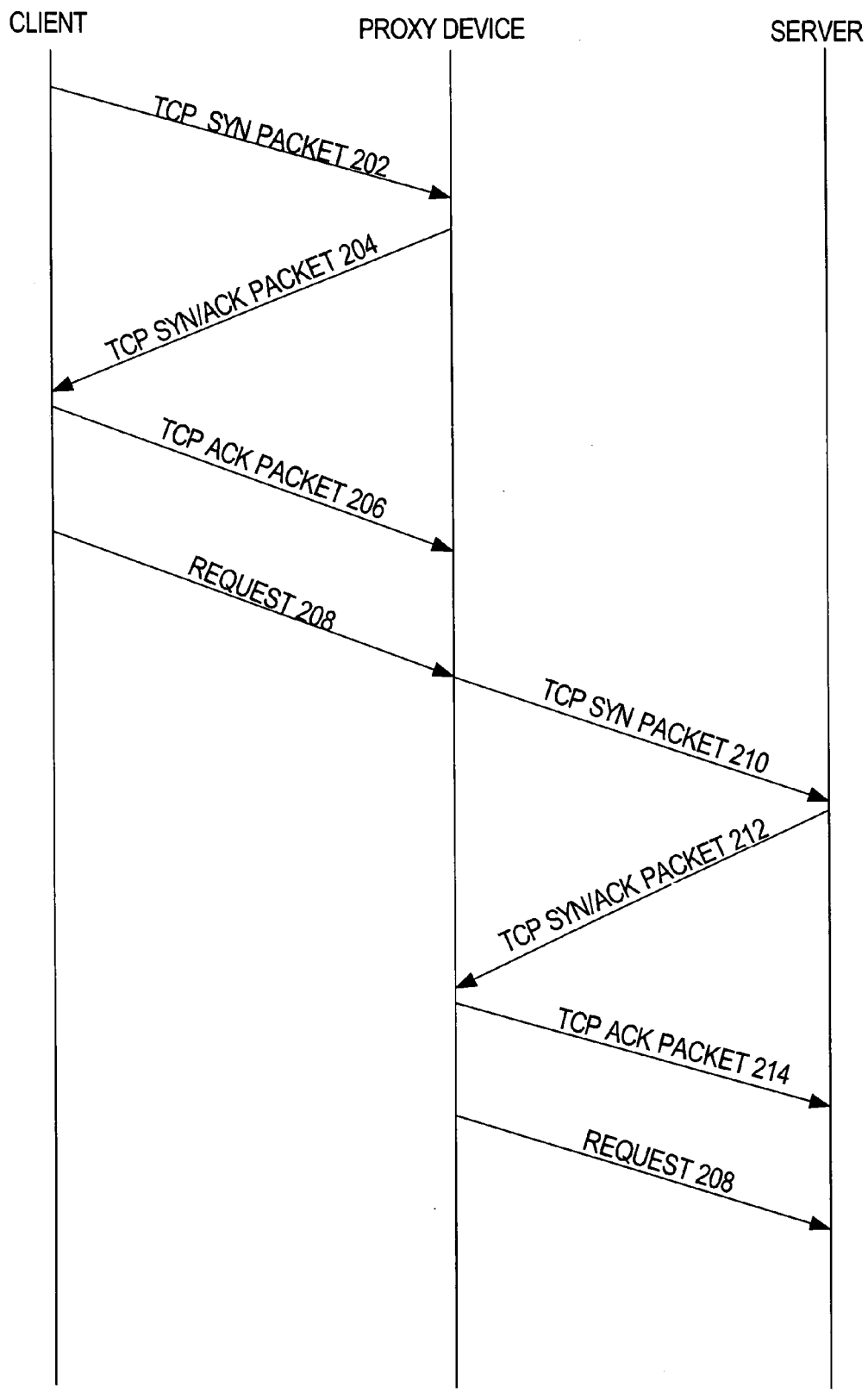
FIG. 2 is a diagram that illustrates a message communication sequence, according to one embodiment, by which client-to-proxy device and proxy device-to-server TCP connections are initially established.

FIG. 2 is a diagram that illustrates a message communication sequence, according to one embodiment, by which client-to-proxy device and proxy device-to-server TCP connections are initially established. The message communication sequence encompasses two performances of the "three-way handshake" protocol used in TCP: the first performance between a client and a proxy device, and the second between the proxy device and server.

The client sends a TCP SYN packet 202 to the proxy device. TCP SYN packet 202 indicates TCP parameters that the client proposes for use in the forthcoming TCP connection. The TCP parameters typically include, for example, a maximum segment size, a window scale factor, and flags that indicate whether time stamping and/or selective acknowledgment will be used.

The proxy device receives TCP SYN packet 202 and responds with a TCP SYN/ACK packet 204. TCP SYN/ACK packet 204 indicates which of the client-proposed TCP parameters the proxy device has accepted for use in the forthcoming TCP connection.

The client receives TCP SYN/ACK packet 204 and responds with a TCP ACK packet 206. With the negotiation between the client and the proxy device concluded, both the client and the proxy device create TCP endpoints based on the TCP parameters negotiated during the handshake phase described above. Thus, a full TCP connection is established between the client and the proxy device.

The client sends a request 208 to the proxy device through the client's TCP endpoint. The proxy device receives request 208 at the proxy device's TCP endpoint. The proxy device makes a load-balancing decision and determines a server to which request 208 should be sent.

Having determined the server to which request 208 should be sent, the proxy device initiates a handshake phase with the server by sending a TCP SYN packet 210 to the proxy device. TCP SYN packet 210 indicates TCP parameters that the proxy device proposes for use in the forthcoming TCP connection. The TCP parameters typically include the same TCP parameters negotiated between the client and the proxy device.

The server receives TCP SYN packet 210 and responds with a TCP SYN/ACK packet 212. TCP SYN/ACK packet 212 indicates which of the proxy device-proposed TCP parameters the server has accepted for use in the forthcoming TCP connection.

The proxy device receives TCP SYN/ACK packet 212 and responds with a TCP ACK packet 214. With the negotiation between the proxy device and the server concluded, both the proxy device and the server create TCP endpoints based on the TCP parameters negotiated during the handshake phase described above. Thus, a full TCP connection is established between the proxy device and the server.

The proxy device may modify request 208 before sending request 208 to the server. Whether or not request 208 is modified, the proxy device sends request 208 to the server through the proxy device's TCP endpoint involved in the proxy device-to-server connection (i.e., not the proxy device's TCP endpoint involved in the client-to-proxy device connection). The server receives request 208 at the server's TCP endpoint.

Together, the client-to-proxy device connection and the proxy device-to-server connection comprise a proxied connection. Referring again to FIG. 1, after proxy device 102 has forwarded a request from a client to a server, proxy device 102 unproxies the proxied connection as described in the foregoing Background. For example, if the proxied connection comprises a first TCP connection between client 108A and proxy device 102, and a second TCP connection between proxy device 102 and server 104A, then proxy device 102 dissolves both (a) the proxy device's TCP connection endpoint that is involved in the TCP connection with client 108A and (b) the proxy device's TCP connection endpoint that is involved in the TCP connection with server 104A, leaving the TCP endpoints on client 108A and server 104A intact.

In conjunction with dissolving the relevant TCP endpoints at proxy device 102, proxy device 102 also frees the resources used to store the TCBs that contain the TCP parameters for those TCP endpoints, thereby making the resources available for other purposes. Before freeing the relevant TCBs, though, proxy device 102 creates connection block data structures for each of the relevant TCP endpoints maintained at proxy device 102. In each connection block data structure, proxy device 102 stores information that will allow proxy device 102 to "splice" the client connection with the server connection.

According to one embodiment, in one such connection block data structure, proxy device 102 stores a tuple that indicates the client's IP address, the proxy device's IP address, a TCP protocol identifier, an identifier of the client's TCP port used in the client-to-proxy device connection, and an identifier of the proxy device's TCP port used in the client-to-proxy device connection. In the other such connection block data structure, proxy device 102 stores a tuple that indicates the proxy device's IP address, the server's IP address, a TCP protocol identifier, an identifier of the proxy device's TCP port used in the proxy device-to-server connection, and an identifier of the server's TCP port used in the proxy device-to-server connection. Additionally, in each of the connection block data structures, proxy device 102 stores a separate sequence delta that indicates to what extent TCP sequence and acknowledgment numbers need to be adjusted when proxy device 102 "translates" these numbers to facilitate transparency between the client and server.

Additionally, in each connection block data structure, proxy device 102 stores reconstruction information that, in conjunction with information that can be derived from any packet sent from the client to the server, will allow proxy device 102 to reconstruct a corresponding dissolved TCP endpoint at the proxy device. In order to reduce the size of the connection block data structures, the reconstruction information generally includes information that cannot be derived from a non-SYN packet and generally excludes information that can be derived from any packet sent from the client to the server.

According to one embodiment, the reconstruction information includes the maximum segment size, the window scale factor, and flags that indicate whether time stamping and selective acknowledgment are to be used in the TCP connection. Storing such information that was negotiated during the handshake phase allows proxy device 102 to reconstruct the dissolved TCP endpoints at proxy device 102 without re-engaging in additional handshake phases.

With the TCP endpoints at proxy device 102 dissolved and the connection block data structures populated as described above, the formerly "proxied" connection is in an "unproxied" state. Continuing the above example, server 104A may send packets to client 108A via the unproxied connection. Because server 104A and client 108A send and receive packets through the same TCP endpoints at server 104A and client 108A, respectively, the unproxied connection appears, to server 104A and client 108A, to be the same as the proxied connection. However, proxy device 102 does not need to maintain TCBs for the unproxied connection. Proxy device 102 also does not need to generate TCP ACK packets in response to receiving packets from server 104A or client 108A; the generation of such TCP ACK packets becomes the responsibility of server 104A and client 108A while the connection is unproxied.

While the connection is unproxied, proxy device 102 matches address information indicated in received packets with tuple information stored in connection block data structures. Proxy device 102 "translates" the TCP sequence and acknowledgement numbers of the received packets using the sequence deltas stored in the matching connection block data structures, and forwards the translated packets to their destinations.

As discussed in the foregoing Background, under some circumstances, an unproxied connection might need to be "reproxied." For example, it may be desirable for proxy device 102 to insert a "cookie" or other content into one or more packets received from server 104A before sending those packets to client 108A. When proxy device 102 modifies a packet received from server 104A in this manner, proxy device 102 needs to assume responsibility for guaranteeing reliable delivery of the modified packet to client 108A, because server 104A cannot re-send the modified packet to client 108A if the modified packet should be lost; only proxy device 102 can re-send the modified packet to client 108A.

In order to enable proxy device 102 to assume responsibility for reliable delivery by listening for TCP ACK packets from client 108A and re-sending modified packets for which no corresponding TCP ACK packet is received from client 108A, proxy device 102 reconstructs the dissolved TCP endpoints of the formerly proxied connection. In one embodiment, proxy device 102 reconstructs the dissolved TCP endpoints using a combination of (a) the information that was previously stored in the corresponding connection block data structures and (b) information that can be obtained from any data packet (including non-SYN packets) and that is not contained in the connection block data structures. Thus, proxy device 102 can reproxy the formerly proxied connection without re-engaging in handshake phases with server 104A and client 108A.

Figure 3:
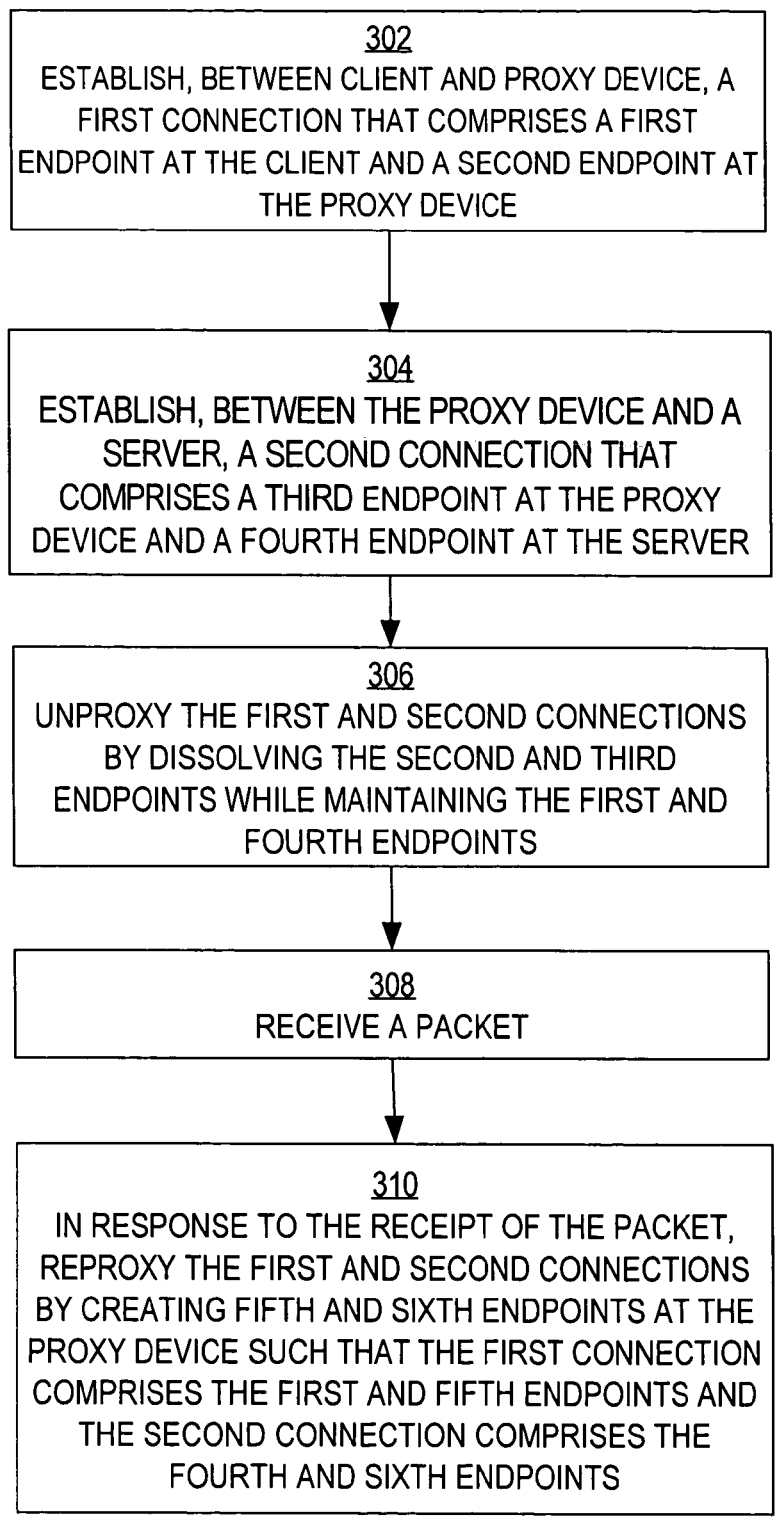
FIG. 3 depicts a flow diagram that illustrates an overview of one embodiment of a method for reproxying a previously unproxied connection.

FIG. 3 depicts a flow diagram 300 that illustrates an overview of one embodiment of a method for reproxying a previously unproxied connection. For example, such a method may be performed by proxy device 102. The operations of the method illustrated in flow diagram 300 encompass the establishment of a proxied connection, the unproxying of that connection, and the reproxying of that connection. Other embodiments may contain operations additional to the operation depicted in flow diagram 300.

In block 302, a first connection is established between a client and a proxy device. The first connection comprises a first endpoint at the client and a second endpoint at the proxy device. For example, client 108A may establish a first full TCP connection with proxy device 102 by engaging in a first handshake phase as described above with reference to FIG. 2.

In block 304, a second connection is established between a server and the proxy device. The second connection comprises a third endpoint at the proxy device and a fourth endpoint at the server. For example, proxy device 102 may establish a second full TCP connection with server 104A by engaging in a second handshake phase as described above with reference to FIG. 2. At this point, the combination of the first and second connections forms a proxied connection.

In block 306, the first and second connections are unproxied by dissolving the second and third endpoints while maintaining the first and fourth endpoints. For example, proxy device 102 may dissolve the TCP endpoints that are at the proxy device and that are involved in the full TCP connections with client 108A and server 104A. Before, throughout, and after this dissolution, the TCP endpoints at client 108A and server 104A remain intact. At this point, the formerly proxied connection is in an un-proxied state.

In block 308, after the dissolution of the second and third endpoints, a packet is received. For example, after proxy device 102 has dissolved the TCP endpoints at proxy device 102 as described above, proxy device 102 may receive a packet that client 108A sent through the TCP endpoint at client 108A. For another example, after proxy device 102 has dissolved the TCP endpoints at proxy device 102 as described above, proxy device 102 may receive a packet that server 104A sent through the TCP endpoint at server 104A.

In block 310, in response to the receipt of the packet, the first and second connections are reproxied by creating a fifth endpoint and a sixth endpoint at the proxy device, such that the first connection comprises the fifth endpoint and the second connection comprises the sixth endpoint. For example, in response to receiving the packet from either client 108A or server 104A, proxy device 102 may reproxy the unproxied connection by reconstructing the two dissolved TCP endpoints at proxy device 102 based on (a) information contained in the packet, and (b) information contained in connection block data structures, as described above. The client-to-proxy device connection then comprises the client's original TCP endpoint and one of the proxy device's reconstructed TCP endpoints, and the proxy device-to-server connection then comprises the server's original TCP endpoint and the other of the proxy device's reconstructed TCP endpoints. Both connections are, once again, full TCP connections having two TCP endpoints each.

Although in one embodiment the reproxy technique described above is performed in response to the receipt of a packet from a client or a server, in alternative embodiments, the reproxy technique is performed in response to other events. For example, the reproxy technique may be performed in response to the modification of a packet's payload. For another example, the reproxy technique may be performed in response to the expiration of a timer.

3.0 Implementation Examples

FIGS. 4A-4E depict a flow diagram 400 that illustrates one embodiment of a method for reproxying a previously unproxied connection. For example, such a method may be performed by proxy device 102. The operations of the method illustrated in flow diagram 400 encompass the establishment of a proxied connection, the unproxying of that connection, and the reproxying of that connection. Other embodiments may contain operations additional to the operation depicted in flow diagram 400.

Figure 4A:
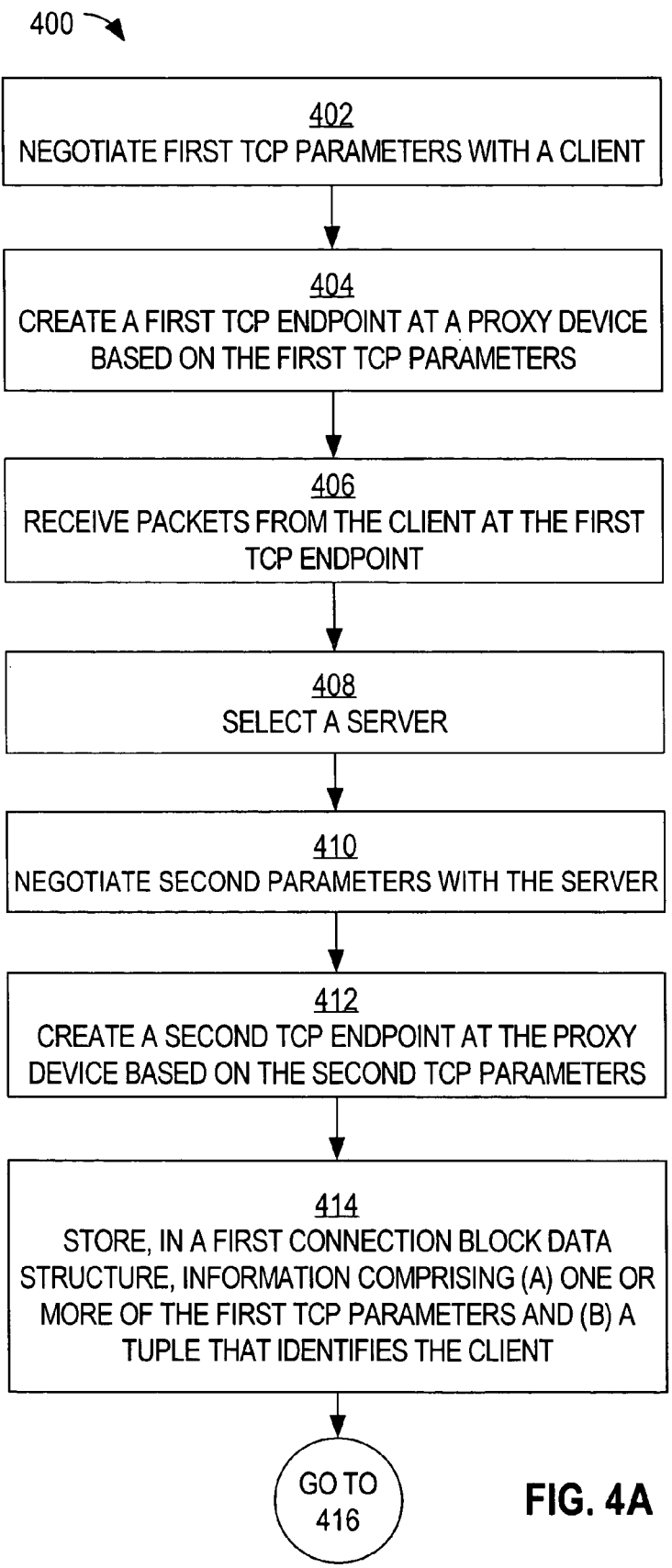
FIGS. 4A-4E depict a flow diagram that illustrates one embodiment of a method for reproxying a previously unproxied connection.

Referring now to FIG. 4A, in block 402, first TCP parameters are negotiated with a client. For example, proxy device 102 may negotiate TCP parameters with client 108A in response to the initiation of a handshake phase by client 108A.

In block 404, a first TCP endpoint is created at a proxy device. The first TCP endpoint is an endpoint in a TCP connection between the client and the proxy device. The first TCP endpoint is based on the first TCP parameters. For example, proxy device 102 may create, at proxy device 102, a TCP endpoint that is based on the TCP parameters negotiated with client 108A. Thus, a full TCP connection is formed between proxy device 102 and client 108A, with the full TCP connection comprising a TCP endpoint at client 108A and a TCP endpoint at proxy device 102.

In block 406, one or more packets are received at the first TCP endpoint. For example, proxy device 102 may receive, at the first TCP endpoint, one or more packets that client 108A sent through the corresponding TCP endpoint at client 108A. The contents of the payload portions of the packets collectively may comprise a first request, such as a first HTTP request.

In block 408, a server is selected from among a plurality of servers. For example, based on a load-balancing scheme, proxy device 102 may select server 104A from among servers 104A-N.

In block 410, second TCP parameters are negotiated with the server. For example, proxy device 102 may negotiate TCP parameters with server 104A.

In block 412, a second TCP endpoint is created at the proxy device. The second TCP endpoint is an endpoint in a TCP connection between the proxy device and the server. The second TCP endpoint is based on the second TCP parameters. For example, proxy device 102 may create, at proxy device 102, a TCP endpoint that is based on the TCP parameters negotiated with server 104A. Thus, a full TCP connection is formed between proxy device 102 and server 104A, with the full TCP connection comprising a TCP endpoint at server 104A and a TCP endpoint at proxy device 102.

In block 414, information is stored in a first connection block data structure. The information comprises (a) one or more of the first TCP parameters, and (b) a tuple that identifies the client. For example, proxy device 102 may store, in a first connection block data structure at proxy device 102, TCP parameters including the maximum segment size, the window scale factor, and flags that indicate whether time stamping and selective acknowledgment are to be used in the TCP connection. These particular TCP parameters are stored because they usually cannot be obtained from any packets communicated outside of the negotiation. TCP parameters that can be obtained from packets communicated outside of the negotiation do not need to be stored.

Additionally, for example, proxy device 102 may store, in the first connection block data structure, a tuple that indicates: an IP address for client 108A, an IP address for proxy device 102, a TCP protocol identifier, an identifier of the TCP port used by client 108A in the client-to-proxy device connection, and an identifier of the TCP port used by proxy device 102 in the client-to-proxy device connection. Using the tuple, proxy device 102 can match packets to destinations.

Furthermore, based on the TCP parameters negotiated with client 108A and server 104A, proxy device 102 may compute and store, in the first connection block data structure, a sequence delta that indicates the extent to which TCP sequence and acknowledgement numbers need to be adjusted in order to achieve transparency in the proxied connection. Proxy device 102 might need to adjust TCP sequence and acknowledgement numbers in packets received from client 108A to match TCP sequence and acknowledgement numbers expected by server 104A.

Figure 4B:
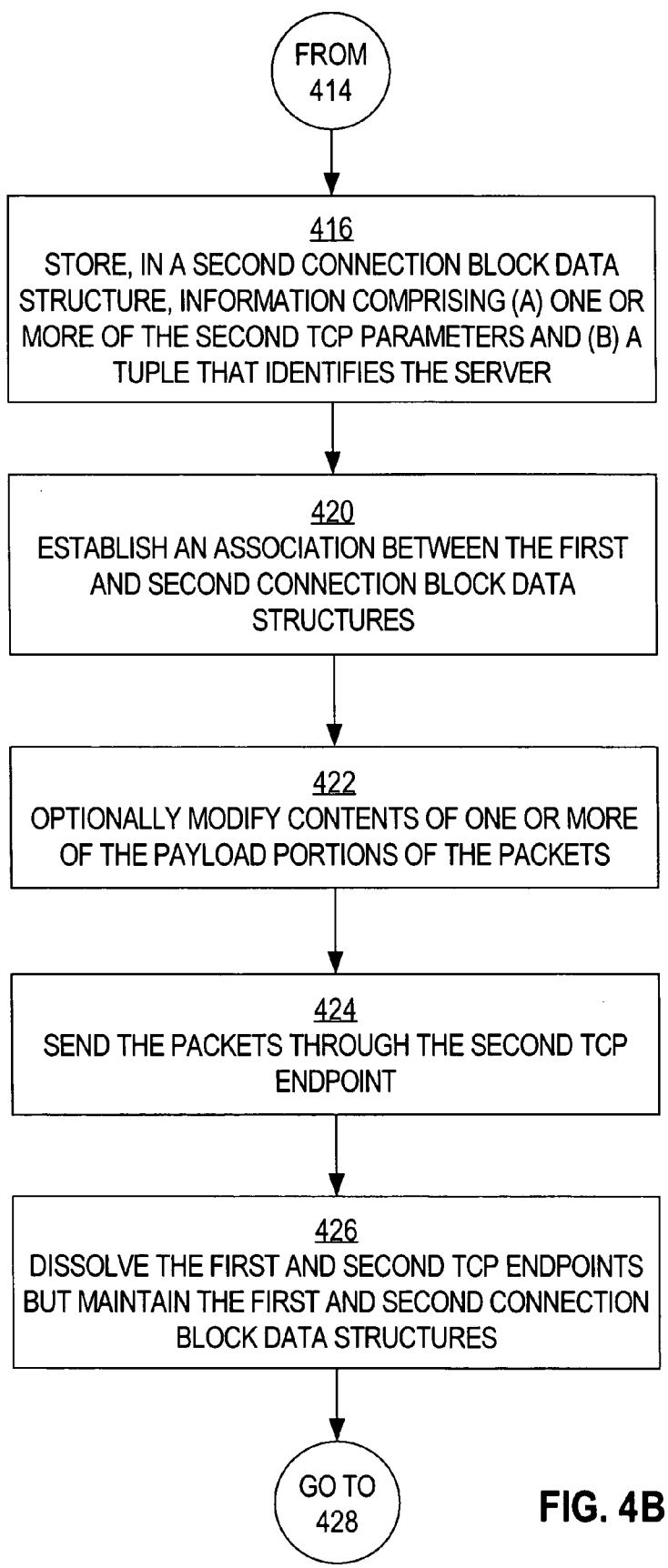

Referring now to FIG. 4B, in block 416, information is stored in a second connection block data structure. The information comprises (a) one or more of the second TCP parameters, and (b) a tuple that identifies the server. For example, proxy device 102 may store, in a second connection block data structure at proxy device 102, the same kind of TCP parameters that proxy device 102 stored in the first connection block data structure.

Additionally, for example, proxy device 102 may store, in the second connection block data structure, a tuple that indicates: an IP address for proxy device 102, an IP address for server 104A, a TCP protocol identifier, an identifier of the TCP port used by proxy device 102 in the proxy device-to-server connection, and an identifier of the TCP port used by server 104A in the proxy device-to-server connection. Using the tuple, proxy device 102 can match packets to destinations.

Furthermore, based on the TCP parameters negotiated with client 108A and server 104A, proxy device 102 may compute and store, in the second connection block data structure, a sequence delta that indicates the extent to which TCP sequence and acknowledgement numbers need to be adjusted in order to achieve transparency in the proxied connection. Proxy device 102 might need to adjust TCP sequence and acknowledgement numbers in packets received from server 104A to match TCP sequence and acknowledgement numbers expected by client 108A.

In block 420, an association is established between the first and second connection block data structures. For example, proxy device 120 may establish this association at proxy device 120.

In block 422, optionally, contents of one or more of the payload portions of the packets received at the first TCP endpoint are modified. For example, proxy device 102 may modify the contents of one of more of the payload portions of packets received from client 108A.

In block 424, the packets are sent through the second TCP endpoint. For example, proxy device 102 may send, through the second TCP endpoint, the packets (possibly modified) that proxy device 102 received at the first TCP endpoint. As a result, the packets are sent to server 104A.

In block 426, the first and second TCP endpoints are dissolved. However, the first and second connection block data structures are maintained. For example, proxy device 102 may dissolve the first and second TCP endpoints established in blocks 404 and 412 while maintaining the first and second connection block data structures populated in blocks 414 and 416. Proxy device 102 may use the resources formerly used to maintain TCBs for the dissolved first and second TCP endpoints for other purposes, such as to establish other TCP connections.

Figure 4C:
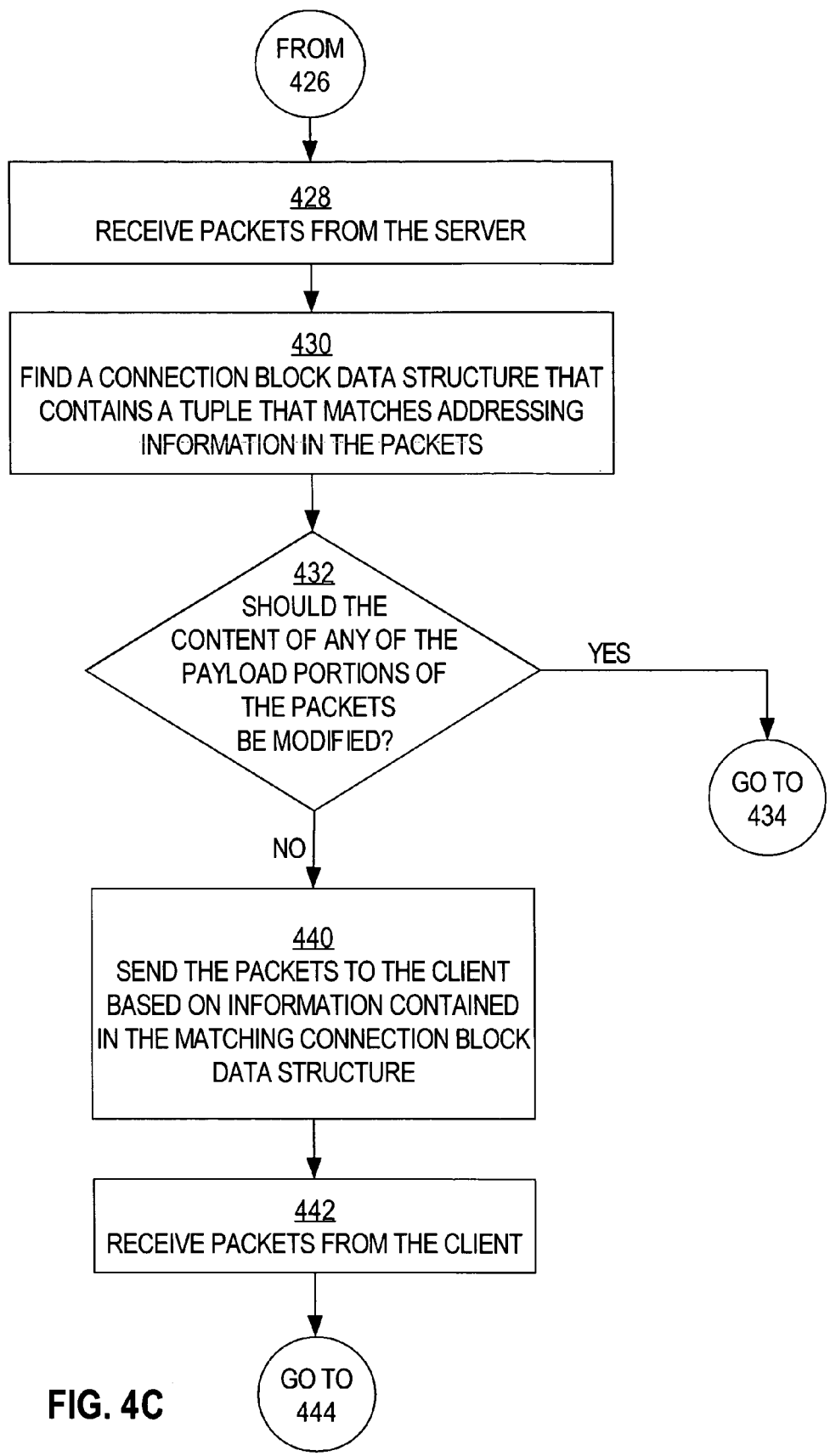

Referring now to FIG. 4C, in block 428, one or more packets are received from the server. For example, proxy device 102 may receive one or more packets that server 104A sent through the TCP endpoint remaining at server 104A. The contents of the payload portions of the packets collectively may comprise a response, such as an HTTP response to the first HTTP request discussed above.

In block 430, a connection block data structure that contains a tuple that matches addressing information in the packets is found. For example, proxy device 102 may compare the IP addresses and TCP ports indicated in the packets with the tuples contained in connection block data structures stored at proxy device 102. Proxy device 102 may find that the second connection block data structure contains a tuple that matches the IP addresses and TCP ports indicated in the packets.

In block 432, it is determined whether the content of any of the payload portions of the packets received from the server should be modified. For example, proxy device 102 may inspect the content of the payload portions of the packets received from the server, and, if the content matches a specified pattern, determine that a "cookie" associated with the specified pattern should be inserted into the content. If it is determined that the content of one or more of the payload portions of the packets should be modified, then control passes to block 434. Otherwise, control passes to block 440.

Figure 4D:
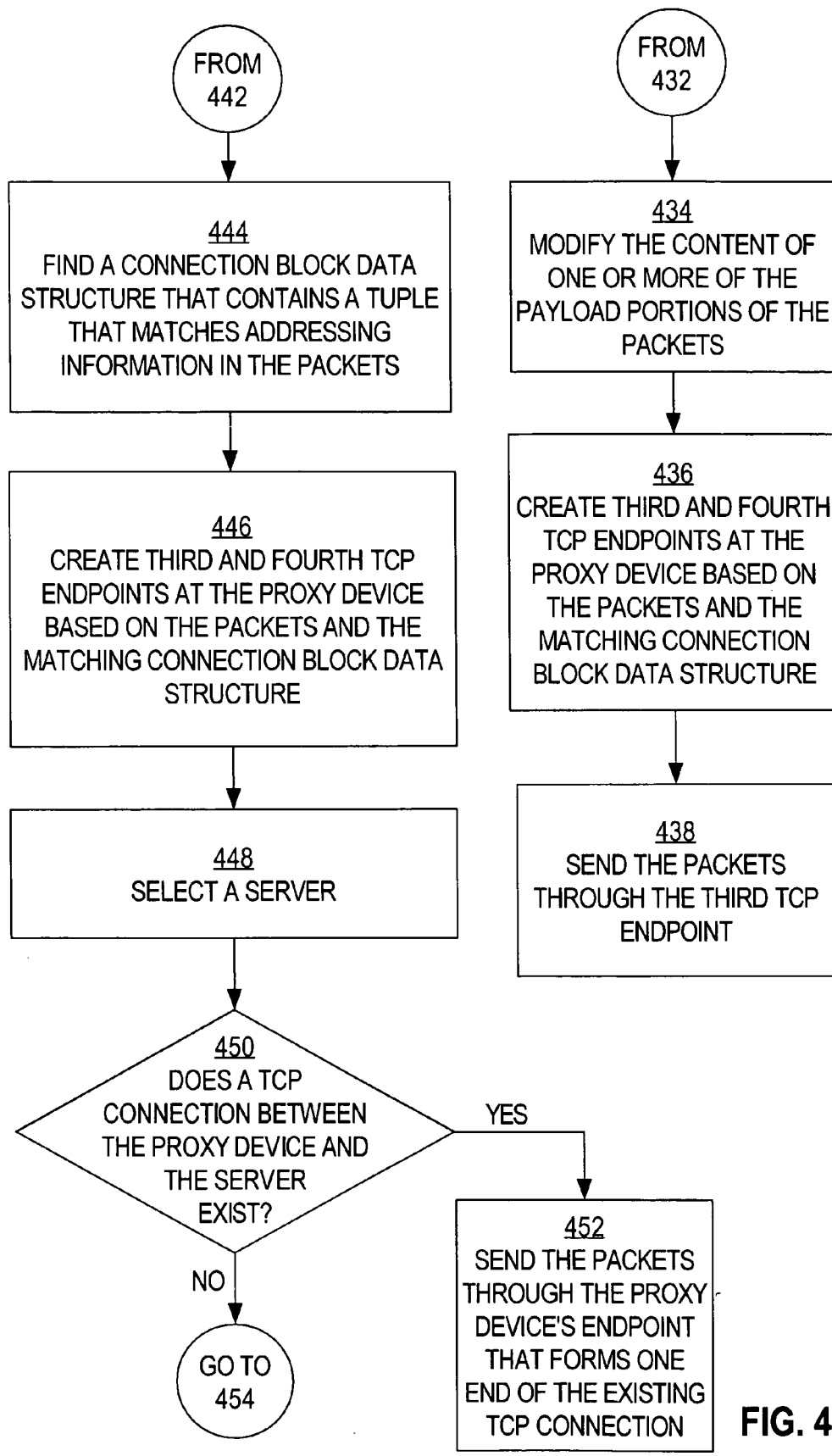

Referring now to FIG. 4D, in block 434, the content of one or more of the payload portions of the packets is modified. For example, proxy device 102 may insert a "cookie" into the payload portions of one or more of the packets received from server 104A. Control passes to block 436.

In block 436, third and fourth TCP endpoints are created at the proxy device such that the first and second full TCP connections are reconstructed, thereby reproxying the unproxied connection. The first full TCP connection comprises (a) the third TCP endpoint at the proxy device and (b) the original TCP endpoint at the client. The second full TCP connection comprises (a) the fourth TCP endpoint at the proxy device and (b) the original TCP endpoint at the server.

The fourth TCP endpoint is created based on (a) one or more TCP parameters contained in at least one of the packets received from the server and (b) the TCP parameters stored in the matching connection block data structure found in block 430. For example, proxy device 102 may allocate and populate a TCB for the fourth TCP endpoint based on the maximum segment size, the window scale factor, and flags that proxy device 102 stored in the second connection block data structure in block 416. The TCB for the fourth TCP endpoint also may be populated based on actual sequence numbers indicated in the packets received from server 104A.

Similarly, the third TCP endpoint is created based on (a) one or more TCP parameters contained in at least one of the packets received from the server and (b) the TCP parameters stored in the connection block data structure that was associated, in block 420, with the matching connection block data structure found in block 430. Thus, the third and fourth TCP endpoints are reconstructed without the proxy device re-negotiating the TCP parameters with the client or server. After the third and fourth TCP endpoints have been created, control passes to block 438.

In block 438, the packets received from the server, including the packets containing the modified payload portions, are sent through the third TCP endpoint. For example, proxy device 102 may send the packets through the third TCP endpoint. As a result, the packets are sent to client 108A. For each such packet, proxy device 102 may listen for a corresponding TCP ACK packet from client 108A. If a specified amount of time passes before proxy device 102 receives a TCP ACK packet for a particular packet, then proxy device 102 may re-send the particular packet to client 108A. Thus, proxy device 102 may ensure that any packets whose payload portions proxy device 102 modified are reliably transported.

Alternatively, referring again to FIG. 4C, in block 440, the packets received from server 104A are sent to the client. The packets are sent, based on the information contained in the matching connection block data structure found in block 430, over the unproxied connection. For example, proxy device 102 may send the packets to client 108A according to the information contained in the second connection block data structure. In this case, proxy device 102 does not need to listen for TCP ACK packets from client 108A; server 104 is responsible for ensuring that the packets are transported reliably to client 108A. Control passes to block 442.

In block 442, one or more packets are received from the client. For example, proxy device 102 may receive, over the unproxied connection, one or more packets that client 108A sent through the TCP endpoint remaining at client 108A. The contents of the payload portions of the packets collectively may comprise a request, such as a second HTTP request that differs from the first HTTP request discussed above. Control passes to block 444

Referring again to FIG. 4D, in block 444, a connection block data structure that contains a tuple that matches addressing information in the packets is found. For example, proxy device 102 may compare the IP addresses and TCP ports indicated in the packets with the tuples contained in connection block data structures stored at proxy device 102. Proxy device 102 may find that the first connection block data structure contains a tuple that matches the IP addresses and TCP ports indicated in the packets. Control passes to block 446.

In block 446, third and fourth TCP endpoints are created at the proxy device such that the first and second full TCP connections are reconstructed, thereby reproxying the unproxied connection. The first full TCP connection comprises (a) the third TCP endpoint at the proxy device and (b) the original TCP endpoint at the client. The second full TCP connection comprises (a) the fourth TCP endpoint at the proxy device and (b) the original TCP endpoint at the server. Details concerning the creation of third and fourth endpoints at the proxy device are described above in relation to block 436. Control passes to block 448.

In block 448, a server is selected from among the plurality of servers. The server may be the same server selected in block 408, or a different server. For example, based on a load-balancing scheme, proxy device 102 may select server 104A or server 104B from among servers 104A-N. Control passes to block 450.

In block 450, it is determined whether a full TCP connection exists between the proxy device and the server. If a full TCP connection exists between the proxy device and the server, then control passes to block 452. Otherwise, control passes to block 454.

In block 452, the packets are sent through the proxy device's endpoint that forms one end of the existing full TCP connection. For example, if the server selected in block 448 is server 104A, then proxy device 102 may send, through the fourth TCP endpoint, the packets that proxy device 102 received from client 108A in block 442. As a result, the packets are sent to server 104A.

Figure 4E:
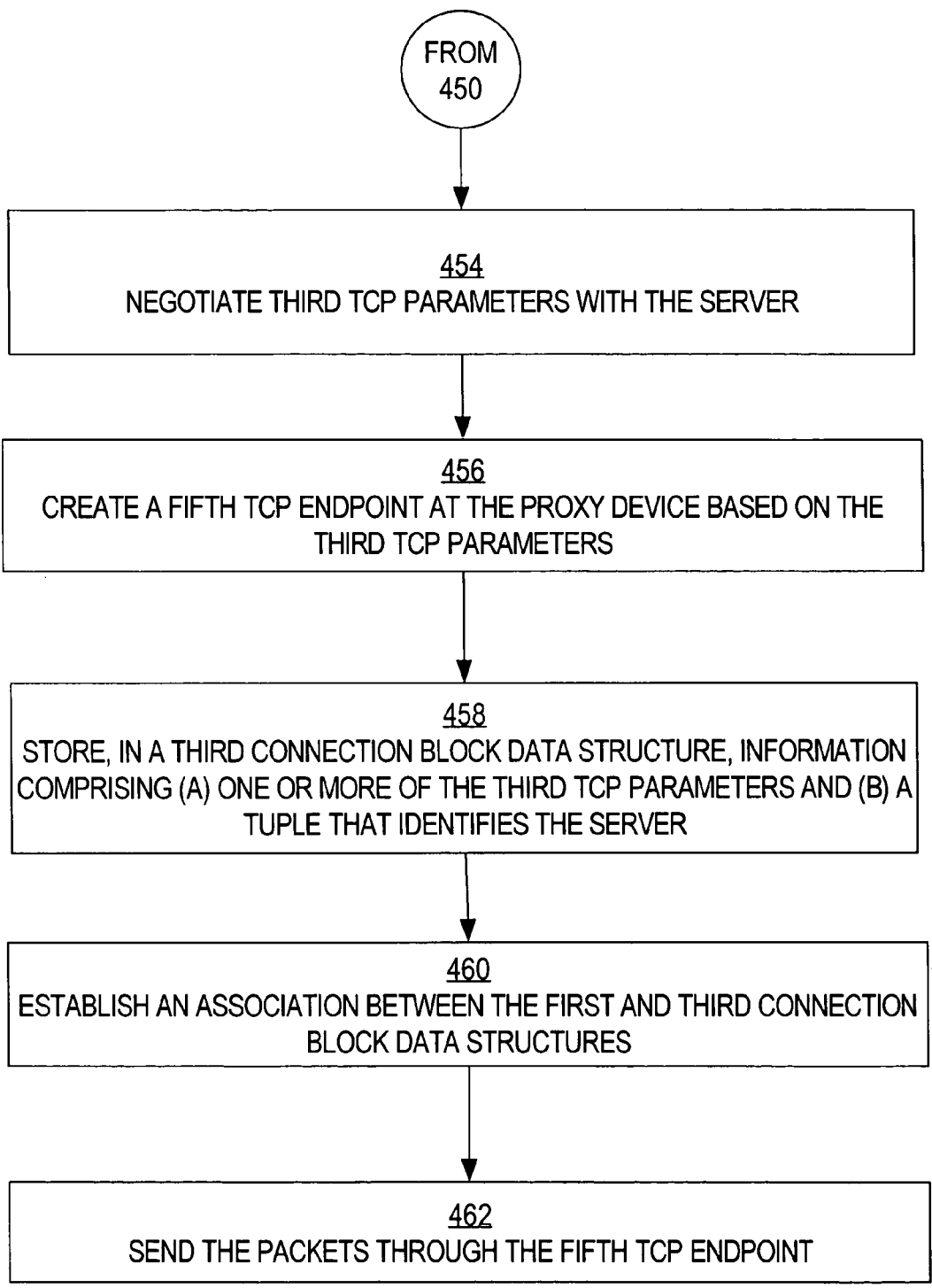

Alternatively, referring now to FIG. 4E, in block 454, third TCP parameters are negotiated with the server selected in block 448. For example, proxy device 102 may negotiate TCP parameters with server 104B. Control passes to block 456.

In block 456, a fifth TCP endpoint is created at the proxy device. The fifth TCP endpoint is an endpoint in a TCP connection between the proxy device and the server selected in block 448. The fifth TCP endpoint is based on the third TCP parameters. For example, proxy device 102 may create, at proxy device 102, a TCP endpoint that is based on the TCP parameters negotiated with server 104B. Thus, a full TCP connection is formed between proxy device 102 and server 104B, with the full TCP connection comprising a TCP endpoint at server 104B and a TCP endpoint at proxy device 102. Control passes to block 458.

In block 458, information is stored in a third connection block data structure. The information comprises (a) one or more of the third TCP parameters, and (b) information that identifies the server selected in block 448. For example, proxy device 102 may store, in a third connection block data structure at proxy device 102, the same kind of TCP parameters that proxy device 102 stored in the first connection block data structure.

In block 460, an association is established between the first and third connection block data structures. The association between the first and second connection block data structures, established in block 420, is dissolved.

In block 462, the packets are sent through the fifth TCP endpoint. For example, proxy device 102 may send, through the fifth TCP endpoint, the packets that proxy device 102 received from client 108A in block 442. As a result, the packets are sent to server 104B.

4.0 Implementation Mechanisms—Hardware Overview

Figure 5:
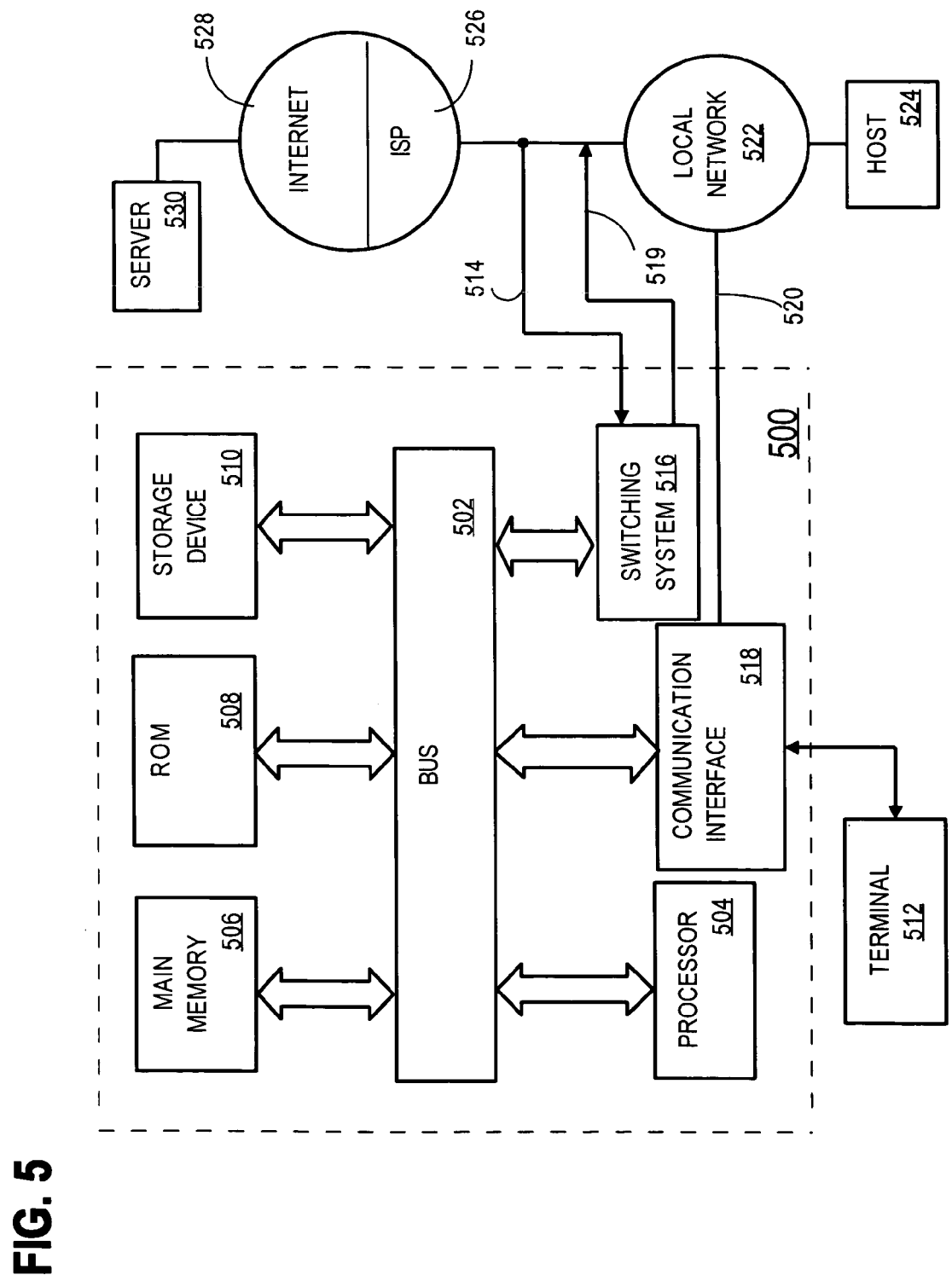
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a proxy device. Thus, in this embodiment, the computer system 500 is a proxy device such as a load balancer.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for avoiding the storage of client state on computer system 500. According to one embodiment of the invention, computer system 500 provides for such updating in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for avoiding the storage of client state on a server as described herein.

Processor 504 may execute the received code as it is received and/or stored in storage device 510 or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of reproxying a previously unproxied connection, the method comprising the computer-implemented steps of:

establishing a proxied connection between a client and a first server through an intermediate network element, at the intermediate network element:

creating, based on first TCP parameters, a first Transmission Control Protocol (TCP) endpoint of a first TCP connection to the client;

storing, in a first connection block data structure, (a) one or more of the first TCP parameters, and (b) information that identifies the client;

creating, based on second TCP parameters, a second TCP endpoint of a second TCP connection to the first server;

storing, in a second connection block data structure, (a) one or more of the second TCP parameters, and (b) information that identifies the first server;

unproxying the first TCP connection and the second TCP connection by dissolving the first and second TCP endpoints while maintaining the first and second connection block data structures and leaving TCP connection endpoints on the client and the first server intact;

receiving a first packet after the first and second TCP endpoints have been dissolved; and in response to receiving the first packet after the first and second TCP endpoints have been dissolved, reproxying the first TCP connection and the second TCP connection, without re-engaging in a handshake session with either of the first server and the client, wherein said reproxying the first TCP connection and the second TCP connection comprises:

at the intermediate network element:

based on (a) one or more TCP parameters indicated in the first packet and (b) the one or more of the first TCP parameters stored in the first connection block data structure, reconstructing the first TCP endpoint of the first TCP connection to the client; and based on (a) one or more TCP parameters indicated in the first packet and (b) the one or more of the second TCP parameters stored in the second connection block data structure, reconstructing the second TCP endpoint of the second TCP connection to the first server;

wherein the first packet is not a TCP SYN packet;

wherein reconstructing the first TCP endpoint comprises reconstructing the first TCP endpoint without renegotiating the first TCP parameters with the client;

wherein the method is performed by one or more computing devices comprising a processor.

2. A method as recited in claim 1, the method further comprising:

negotiating the first Transmission Control Protocol (TCP) parameters with the client; and negotiating the second TCP parameters with the first server.

3. A method as recited in claim 1, wherein the first packet does not indicate either (a) the one or more of the first TCP parameters stored in the first connection block data structure or (b) the one or more of the second TCP parameters stored in the second connection block data structure.

4. A method as recited in claim 1, wherein (a) the first TCP parameters indicate a TCP sequence number and (b) the first connection block data structure does not indicate a TCP sequence number.

5. A method as recited in claim 4, wherein (a) the first packet indicates a particular TCP sequence number and (b) reconstructing the first TCP endpoint is based on the particular TCP sequence number.

6. A method as recited in claim 1, wherein (a) the first TCP parameters indicate a maximum segment size, (b) the first connection block data structure indicates the maximum segment size, (c) the first packet does not indicate the maximum segment size, and (d) reconstructing the first TCP endpoint is based on the maximum segment size.

7. A method as recited in claim 1, wherein (a) the first TCP parameters indicate a window scaling factor, (b) the first connection block data structure indicates the maximum segment size, (c) the first packet does not indicate the maximum segment size, and (d) reconstructing the first TCP endpoint is based on the maximum segment size.

8. A method as recited in claim 1, the method further comprising:
receiving a second packet at the first TCP endpoint;
in response to receiving the second packet, selecting the first server from among a plurality of servers; and
in response to selecting the first server, sending the second packet through the second TCP endpoint.

9. A method as recited in claim 1, the method further comprising:
in response to receiving the first packet, selecting the first server from among a plurality of servers; and
in response to selecting the first server, sending the first packet through the second TCP endpoint after the second TCP endpoint is reconstructed.

10. A method as recited in claim 1, the method further comprising:
in response to receiving the first packet, selecting a second server from among a plurality of servers, wherein the second server is not the first server; and
in response to selecting the second server, performing steps comprising:
negotiating third TCP parameters with the second server;
creating a fifth TCP endpoint that is an endpoint in a TCP connection to the second server and that is based on the third TCP parameters; and
sending the first packet through the fifth TCP endpoint.

11. A method as recited in claim 1, the method further comprising:
after receiving the first packet, modifying content contained in a payload of the first packet; and
after modifying the content, sending the first packet through the first TCP endpoint after the first endpoint is reconstructed.

12. A method as recited in claim 1, the method further comprising:
after receiving the first packet, modifying content contained in a payload of the first packet; and
after modifying the content, sending the first packet through the second TCP endpoint after the second endpoint is reconstructed.

13. A method as recited in claim 1, wherein the first connection block data structure indicates a first source Internet Protocol (IP) address, a first destination IP address, a first protocol identifier, a first source port, and a first destination port.

14. A method as recited in claim 13, the method further comprising:
determining whether the first source IP address matches a second source IP address indicated in the first packet;
determining whether the first destination IP address matches a second destination IP address indicated in the first packet;
determining whether the first protocol identifier matches a second protocol identifier indicated in the first packet;
determining whether the first source port matches a second source port indicated in the first packet; and
determining whether the first destination port matches a second destination port indicated in the first packet.

15. An apparatus for reproxying a previously unproxied connection, comprising:
a network interface that is coupled to a data network for receiving one or more packet flows therefrom;
a processor;
one or more stored sequences of instructions which, when executed by the processor, cause the processor to carry out the steps of:
establishing a proxied connection between a client and a first server through an intermediate network element,
at the intermediate network element:
creating, based on first TCP parameters, a first Transmission Control Protocol (TCP) endpoint of a first TCP connection to the client;
storing, in a first connection block data structure, (a) one or more of the first TCP parameters, and (b) information that identifies the client;
creating, based on second TCP parameters, a second TCP endpoint of a second TCP connection to the first server;
storing, in a second connection block data structure, (a) one or more of the second TCP parameters, and (b) information that identifies the first server;
unproxying the first TCP connection and the second TCP connection by dissolving the first and second TCP endpoints while maintaining the first and second connection block data structures and leaving TCP connection endpoints on the client and the first server intact;
receiving a first packet after the first and second TCP endpoints have been dissolved; and
in response to receiving the first packet after the first and second TCP endpoints have been dissolved, reproxying the first TCP connection and the second TCP connection, without re-engaging in a handshake session with either of the first server and the client, wherein said reproxying the first TCP connection and the second TCP connection comprises:
at the intermediate network element:
based on (a) one or more TCP parameters indicated in the first packet and (b) the one or more of the first TCP parameters stored in the first connection block data structure, reconstructing the first TCP endpoint of the first TCP connection to the client; and
based on (a) one or more TCP parameters indicated in the first packet and (b) the one or more of the second TCP parameters stored in the second connection block data structure, reconstructing the second TCP endpoint of the second TCP connection to the first server;
wherein the first packet is not a TCP SYN packet;
wherein reconstructing the first TCP endpoint comprises reconstructing the first TCP endpoint without renegotiating the first TCP parameters with the client.

16. An apparatus as recited in claim 15, wherein the one or more stored sequences of instructions further comprise instructions which, when executed by the processor, cause the processor to carry out the steps of:

negotiating the first Transmission Control Protocol (TCP) parameters with the client; and negotiating the second TCP parameters with the first server.

17. An apparatus as recited in claim 15, wherein the first packet does not indicate either (a) the one or more of the first TCP parameters stored in the first connection block data structure or (b) the one or more of the second TCP parameters stored in the second connection block data structure.

18. An apparatus as recited in claim 15, wherein (a) the first TCP parameters indicate a TCP sequence number and (b) the first connection block data structure does not indicate a TCP sequence number.

19. An apparatus as recited in claim 18, wherein (a) the first packet indicates a particular TCP sequence number and (b) reconstructing the first TCP endpoint is based on the particular TCP sequence number.

20. An apparatus as recited in claim 15, wherein (a) the first TCP parameters indicate a maximum segment size, (b) the first connection block data structure indicates the maximum segment size, (c) the first packet does not indicate the maximum segment size, and (d) reconstructing the first TCP endpoint is based on the maximum segment size.

21. An apparatus as recited in claim 15, wherein (a) the first TCP parameters indicate a window scaling factor, (b) the first connection block data structure indicates the maximum segment size, (c) the first packet does not indicate the maximum segment size, and (d) reconstructing the first TCP endpoint is based on the maximum segment size.

22. An apparatus as recited in claim 15, wherein the one or more stored sequences of instructions further comprise instructions which, when executed by the processor, cause the processor to carry out the steps of:

receiving a second packet at the first TCP endpoint;

in response to receiving the second packet, selecting the first server from among a plurality of servers; and in response to selecting the first server, sending the second packet through the second TCP endpoint.

23. An apparatus as recited in claim 15, wherein the one or more stored sequences of instructions further comprise instructions which, when executed by the processor, cause the processor to carry out the steps of:

in response to receiving the first packet, selecting the first server from among a plurality of servers; and in response to selecting the first server, sending the first packet through the second TCP endpoint after the second TCP endpoint is reconstructed.

24. An apparatus as recited in claim 15, wherein the one or more stored sequences of instructions further comprise instructions which, when executed by the processor, cause the processor to carry out the steps of:

in response to receiving the first packet, selecting a second server from among a plurality of servers, wherein the second server is not the first server; and in response to selecting the second server, performing steps comprising:

negotiating third TCP parameters with the second server;

creating a fifth TCP endpoint that is an endpoint in a TCP connection to the second server and that is based on the third TCP parameters; and sending the first packet through the fifth TCP endpoint.

25. An apparatus as recited in claim 15, wherein the one or more stored sequences of instructions further comprise instructions which, when executed by the processor, cause the processor to carry out the steps of:

after receiving the first packet, modifying content contained in a payload of the first packet; and after modifying the content, sending the first packet through the first TCP endpoint after the first TCP endpoint is reconstructed.

26. An apparatus as recited in claim 15, wherein the one or more stored sequences of instructions further comprise instructions which, when executed by the processor, cause the processor to carry out the steps of:

after receiving the first packet, modifying content contained in a payload of the first packet; and after modifying the content, sending the first packet through the second TCP endpoint after the second TCP endpoint is reconstructed.

27. An apparatus as recited in claim 15, wherein the first connection block data structure indicates a first source Internet Protocol (IP) address, a first destination IP address, a first protocol identifier, a first source port, and a first destination port.

28. An apparatus as recited in claim 27, wherein the one or more stored sequences of instructions further comprise instructions which, when executed by the processor, cause the processor to carry out the steps of:

determining whether the first source IP address matches a second source IP address indicated in the first packet;

determining whether the first destination IP address matches a second destination IP address indicated in the first packet;

determining whether the first protocol identifier matches a second protocol identifier indicated in the first packet;

determining whether the first source port matches a second source port indicated in the first packet; and determining whether the first destination port matches a second destination port indicated in the first packet.

29. A non-transitory computer-readable medium storing instructions for reproxying a previously unproxied connection, which instructions, when executed by one or more processors, cause performance of:

establishing a proxied connection between a client and a first server through an intermediate network element, at the intermediate network element:

creating, based on first TCP parameters, a first Transmission Control Protocol (TCP) endpoint of a first TCP connection to the client;

storing, in a first connection block data structure, (a) one or more of the first TCP parameters, and (b) information that identifies the client;

creating, based on second TCP parameters, a second TCP endpoint of a second TCP connection to the first server;

storing, in a second connection block data structure, (a) one or more of the second TCP parameters, and (b) information that identifies the first server;

unproxying the first TCP connection and the second TCP connection by dissolving the first and second TCP endpoints while maintaining the first and second connection block data structures and leaving TCP connection endpoints on the client and the first server intact;

receiving a first packet after the first and second TCP endpoints have been dissolved; and in response to receiving the first packet after the first and second TCP endpoints have been dissolved, reproxying the first TCP connection and the second TCP connection, without re-engaging in a handshake session with either of the first server and the client, wherein said reproxying the first TCP connection and the second TCP connection comprises:

at the intermediate network element:
- based on (a) one or more TCP parameters indicated in the first packet and (b) the one or more of the first TCP parameters stored in the first connection block data structure, creating a third reconstructing the first TCP endpoint of the first TCP connection to the client; and
- based on (a) one or more TCP parameters indicated in the first packet and (b) the one or more of the second TCP parameters stored in the second connection block data structure, reconstructing the second TCP endpoint of the second TCP connection to the first server;

wherein the method is performed by one or more computing devices comprising a processor;

wherein the first packet is not a TCP SYN packet;

wherein reconstructing the first TCP endpoint comprises reconstructing the first TCP endpoint without renegotiating the first TCP parameters with the client.

30. A non-transitory computer-readable medium as recited claim 29, wherein the first packet does not indicate either (a) the one or more of the first TCP parameters stored in the first connection block data structure or (b) the one or more of the second TCP parameters stored in the second connection block data structure.

31. A non-transitory computer-readable medium as recited claim 29, wherein instructions for reconstructing the first TCP endpoint comprises instructions for reconstructing the first TCP endpoint without renegotiating TCP parameters with the client.

32. A non-transitory computer-readable medium as recited in claim 29, wherein (a) the first TCP parameters indicate a TCP sequence number and (b) the first connection block data structure does not indicate a TCP sequence number.

33. A non-transitory computer-readable medium as recited in claim 29, wherein (a) the first packet indicates a particular TCP sequence number and (b) reconstructing the first TCP endpoint is based on the particular TCP sequence number.

34. A non-transitory computer-readable medium as recited in claim 29, wherein (a) the first TCP parameters indicate a maximum segment size, (b) the first connection block data structure indicates the maximum segment size, (c) the first packet does not indicate the maximum segment size, and (d) reconstructing the first TCP endpoint is based on the maximum segment size.

35. A non-transitory computer-readable medium as recited in claim 29, wherein (a) the first TCP parameters indicate a window scaling factor, (b) the first connection block data structure indicates the maximum segment size, (c) the first packet does not indicate the maximum segment size, and (d) reconstructing the first TCP endpoint is based on the maximum segment size.

* * * * *